United States Patent
Jones et al.

[15] 3,686,279
[45] Aug. 22, 1972

[54] 2-METHYLENE-3-BUTENYL SULFONIUM SALTS USEFUL AS MONOMERS

[72] Inventors: Giffin D. Jones, 4002 Cambridge; Gerald R. Geyer, 1424 Airfield Lane, both of Midland, Mich. 48640; Melvin J. Hatch, 1217 Apache Dr., Socorro, N. Mex. 87801

[22] Filed: Aug. 27, 1969

[21] Appl. No.: 853,538

Related U.S. Application Data

[62] Division of Ser. No. 709,522, Dec. 28, 1967, Pat. No. 3,494,965, which is a division of Ser. No. 381,546, July 9, 1964, abandoned.

[52] U.S. Cl. .............................................260/481 R
[51] Int. Cl. ..........................................C07c 143/12
[58] Field of Search..........260/470 A, 481 R, 526 S, 515 M

[56] References Cited

UNITED STATES PATENTS 3,478,154    11/1969    Ratts......................260/481 R

*Primary Examiner*—Lewis Gotts
*Assistant Examiner*—John F. Terapane
*Attorney*—Griswold and Burdick and David B. Kellom

[57] ABSTRACT

New cationic sulfonium monomers of the Formula

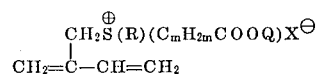

are prepared by reaction of 2-halomethyl-1,3-butadiene with an organic carboxyalkyl sulfide ($RSC_mH_{2m}COOQ$). These sulfonium monomers can be polymerized to form cationic polymers useful in paper coatings.

4 Claims, No Drawings

2-METHYLENE-3-BUTENYL SULFONIUM SALTS USEFUL AS MONOMERS

This is a division of application Ser. No. 709,522 filed Dec. 28, 1967 now U.S. Pat. No. 3494,965 which is in turn a division of application Ser. No. 381,546 filed July 9, 1964 and now abandoned.

The new cationic sulfonium monomers of the Formula:

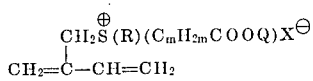

$$\begin{array}{c} \overset{\oplus}{CH_2S}(R)(C_mH_{2m}COOQ)X^{\ominus} \\ | \\ CH_2=C-CH=CH_2 \end{array}$$

where
R is $C_1$–$C_6$ alkyl, $C_2$–$C_4$ monohydroxyalkyl, or $C_7$–$C_{12}$ aralkyl;
m is an integer from 1–4 inclusive;
Q is H, $C_1$–$C_6$ alkyl, or a monovalent cation; and
X is a monovalent anion.
are preferably prepared from 2-chloromethyl-1,3butadiene, although the corresponding bromomethyl derivative can also be used, by reaction of 2-chloromethyl-1,3-butadiene with an appropriate reagent to substitute for the reactive chloro group a functional cationic sulfonium group. It has further been discovered that useful polymers can also be obtained by polymerization of the cationic monomers.

The novel cationic monomers described herein are soluble in such polar hydroxylic solvents as water, lower alcohols, or ethylene glycol. The cationic monomers are of interest as insecticides or fungicides. Because of the 1,3-diene structure, these monomers can be polymerized alone or with other polymerizable ethylenically unsaturated monomers. By virtue of the cationic substituents, the monomers are useful copolymer components to improve the dye receptivity or to increase the water solubility and hydrophilic properties of polymers otherwise deficient in these properties.

By appropriate choice of the functional cationic group, soluble polymers with varied chemical and physical properties desired for flocculants, dispersants, or thickeners can be obtained. Particularly useful are water-soluble cationic polymers which can be used without the hazards of flammability, toxicity and volatility often associated with organic solvent systems. Such cationic polymers are particularly advantageous as electroconductive or wet-strength additives for paper and other cellulosic products.

The properties of these new cationic polymers are dependent both on the specific functional moieties and on the backbone polymer matrix. The presence of residual unsatuaration in the polymer provides ready sites for subsequent modification of the polymer. For example, the cationic polymer applied as a paper coating can be further polymerized or cross-linked to decrease the water sensitivity of the coating. Alternatively the unsaturation offers potential sites for oxidative or biological degradation of the polymer if only temporary utility is desired.

I. CATIONIC 1,3-BUTADIENE MONOMERS

2-Chloromethyl-1,3-butadiene is conveniently prepared by the chlorination of isoprene as described by Berenbaum in U.S. Pat. No. 2,937,125. The chloro group is activated and can be replaced by reaction with suitable organic sulfides to give the desired cationic monomers. Suitable sulfides are those which (1) react with a stoichiometric amount of benzyl chloride to displace at least 5 mole percent of the chloride therefrom in 48 hours at 20°–100° C., and (2) are soluble to the extent of at least 5 wt. % in a polar hydroxylic solvent such as water or a $C_1$–$C_8$ mono- or polyhydric alcohol at 25° C.

A. SULFONIUM MONOMERS

The cationic sulfonium monomers can be prepared by reacting 2-chloromethyl-1,3-butadiene with an organic sulfide. Particularly desirable are the sulfonium derivatives prepared from sulfides of the general formula: RSR'
wherein
R is a member of the group consisting of $C_1$–$C_6$ alkyl, $C_2$–$C_4$ monohydroxyalkyl, and $C_7$–$C_{12}$ aralkyl groups; and
R' is a member of the group consisting of
1. $C_1$–$C_6$ alkyl and $C_2$–$C_4$ monohydroxy alkyl groups, and
2. —$C_mH_{2m}$COOQ wherein m is an integer from 1 to 4 inclusive and Q is hydrogen, a $C_1$–$C_6$ alkyl group, or a monovalent cation.

Typical organic sulfides which may be employed are dimethylsulfide, n-butylmethylsulfide, 2-(methylmercapto)ethanol, bis-(2-hydroxyethyl)sulfide, and methyl 3-methylthiopropionate. Generally, it is preferable to use an organic sulfide wherein one of the substituent groups contains not more than two carbon atoms.

Although the reaction of 2-chloromethyl-1,3-butadiene with an organic sulfide is not as rapid as amination, it can be carried out under similar conditions preferably using water, alcohol, ethylene glycol or a similar solvent as a diluent and a reaction temperature between about 20° and 60° C. A reaction time of from 2 to 20 hours or more is often required for complete reaction. With a low boiling solvent or reactant, it may be necessary to use a moderate elevated pressure.

The sulfonium monomers prepared from 2-chloromethyl-1,3-butadiene have normally a chloride counteranion. However, if desired, the chloride anion can be replaced by standard ion exchange techniques with other common anions such as sulfate, bisulfate, nitrate, carbonate, acetate, citrate, etc. However, for most purposes the chloride salt is usually preferred.

B. POLYMERIZATION

By virtue of the 1,3-diene structure, the sulfonium monomers described herein are susceptible to polymerization alone or with other polymerizable ethylenically unsaturated monomers. The polymers range from viscous liquids to white solids depending on factors such as the molecular weight. The composition of copolymers can be varied widely. The amount of cationic monomer required to modify the properties of a polymer is often small. For instance, about 0.5 mole percent of trimethyl(2-methylene-3-butenyl)ammonium chloride copolymerized with a hydrophobic monomer such as styrene provides a copolymer having an appreciable increase in hydrophillic properties. Indeed these cationic 1,3-butadiene monomers are particularly effectively employed in minor proportions ranging from about 0.5 to 20 mole percent based on total monomer to incorporate a moderate number of functional cationic groups in a copolymer.

Among the many known polymerizable ethylenically unsaturated compounds which can be copolymerized with the cationic monomers described herein are vinylaromatic compounds such as styrene, vinyltoluene, divinylbenzene, chlorostyrene and methylstyrene; ethylenic monomers such as vinyl chloride, allyl chloride, acrylonitrile, acrylamide, vinyl ethers and vinyl ketones; other dienes such as 1,3-butadiene, isoprene, chloroprene, and 2-chloromethyl-1,3-butadiene; and other similar compounds containing one or more ethylenic linkages capable of addition polymerization. Combinations of more than two monomers may be used if desired.

These cationic 1,3-butadiene monomers are quite reactive monomers. Polymers and copolymers can be prepared in bulk, in solution or in dispersion using conventional techniques. Polymerization is accelerated by the addition of conventional vinyl polymerization catalysts such as sodium persulfate, hydrogen peroxide, benzoyl peroxide, tertiary butyl peroxide, and $\alpha,\alpha'$-azobisisobutyronitrile. Usually such catalysts are employed in an amount ranging from about 0.1 to 2 weight percent based on total monomer. With a suitable catalyst polymerization is readily achieved at temperatures ranging from about 0° to 100° C.

Within the general scope of this invention, optimum conditions for a particular monomeric or polymeric product can be determined in a routine manner. Furthermore by proper choice of reagents, mole ratios, and reaction conditions, it is possible to prepare derivatives containing more than one type of cationic group. For example, the properties of quaternary ammonium and sulfonium derivatives can be combined in the same product.

In summary, it has been discovered that new and useful cationic monomers and soluble functional cationic polymers can be prepared from 2-chloromethyl-1,3-butadiene. Because of the variety of functional cationic groups which can be bonded to the butadiene polymer matrix through the 2-methylene group, derivatives can be obtained with a wide range of properties. The water-soluble cationic polymers are useful as flocculants in aqueous mineral and sewage systems, as additives to increase the strength or electroconductivity of paper, while water-insoluble polymers are particularly useful as extractants in removing anions from aqueous process streams.

To illustrate further the invention described herein, the following examples are given. Unless otherwise specified, all parts and percentages are by weight.

EXAMPLE 1: Sulfonium Monomers

A. A mixture of 40 parts methanol, 21 parts (0.21 mole) 2-chloromethyl-1,3-butadiene, and 34 parts (0.55 mole) of dimethylsulfide was stirred at room temperature for about 22 hours. Dilution with water gave a dark, two-phase mixture which was extracted with methylene chloride to remove unreacted material. Titration of the aqueous phase containing the sulfonium chloride titrated for chloride and total acidity, indicated a 75 percent yield of the desired sulfonium chloride. The ultraviolet spectrum of a dilute aqueous solution of the sulfonium chloride had a maximum of 220 m$\mu$ with an extinction coefficient of 12,000 cm.$^2$/mole.

Treatment of a portion of the aqueous product solution with excess lithium picrate gave a deep yellow precipitate of a sulfonium picrate. The molecular weight of a sample of the picrate salt purified by recrystallization from methanol was determined by potentiometric titration in glacial acetic acid with perchloric acid. Calcd. MW, 357; found 359 and 364. A sample of pure dimethyl (2-methylene-3-butenyl)sulfonium chloride was prepared by passing a dilute solution of the sulfonium picrate through a column of strong base anion exchange resin in the chloride form. The ultraviolet, infrared and NMR spectra of the chloride were consistent with the assigned structure.

B. A mixture of 50 parts of 2-chloromethyl-1,3-butadiene (88 percent pure), 74 parts of thiodiglycol and 5 parts of water was stirred at 55° C. for 6 hours giving a thick emulsion. On cooling the phases separated and 116 parts of an aqueous phase, 10.3 parts of an oil layer and 3.8 parts of an insoluble polymer were recovered. The aqueous phase was diluted with water to give a 34 percent solution of bis(2-hydroxyethyl)(2-methylene-3-butenyl)sulfonium chloride. The spectra of the product solution were consistent with this structure. On standing for a period of several weeks at room temperature, the aqueous monomer solution slowly thickened.

EXAMPLE 2: Acrylamide-Sulfonium Copolymer

A solution of 5 parts acrylamide and 1.9 parts of dimethyl(2-methylene-3-butenyl)sulfonium chloride in 15 parts of water was purged with nitrogen and allowed to stand 4 days in a sealed vial. The mixture became noticeably viscous within a few hours and was very syrupy after 4 days. It was then diluted further with water.

The cationic nature of the acrylamide polymer was indicated by coacervation when a sample of the aqueous product solution was added to a solution of sulfonated polyvinyltoluene. When tested as a beater additive, this acrylamide copolymer was effective in improving the wet strength of paper.

EXAMPLE 3: Poly(2-Chloromethyl-1,3-Butadiene) Intermediate

An aqueous emulsion was prepared by vigorously agitating a mixture of 260 parts of 80 percent 2-chloromethyl-1,3-butadiene, 0.12 part of tert.-dodecylmercaptan, and an aqueous solution of 1.4 parts of sodium lauryl sulfate, 0.3 part of potassium persulfate and 0.3 part of sodium bicarbonate in 140 parts of water. Polymerization was achieved by heating the emulsion at about 50° C. for 40 hours. Then the polymer was precipitated by pouring the emulsion into an excess of methanol with vigorous agitation. The finely divided, white product was recovered by filtration, washed with methanol and then air dried.

The poly(2-chloromethyl-1,3-butadiene) was insoluble in water and methanol, but dissolved in methylene chloride, toluene and tetrahydrofuran. It contained 30.3 wt. percent side chain chlorine as determined by reaction with excess trimethylamine and 31.5 wt. percent total chlorine by elemental analysis. The higher total chlorine content indicates copolymerization of some 1-chloro-2-methyl-1,3-butadiene. The polymer had an average molecular weight of 35,000 as determined by the membrane osmotic pressure of a tetrahydrofuran solution. Spectral studies indicate that the polymer has predominately the 1,4-addition structure.

Other polymers and copolymers containing polymerized 2-chloromethyl-1,3-butadiene are prepared in a similar manner.

EXAMPLE 4: Sulfonium Derivatives

To 100 parts of a 2-chloromethyl-1,3-butadiene polymer prepared in a manner similar to that described in Example 1, was added an aqueous solution of 150 parts of thiodiglycol (40 percent excess). The mixture was shaken at room temperature until the polymer dissolved. Since the sulfonium polymer had a tendency to decompose when isolated, it was stored and used as 10–20 wt. percent aqueous solution. A sample precipitated from solution with acetone was found to contain 50.08 percent C, 7.78 percent H, 5.40 percent Cl, 18.75 percent S and 16.95 percent O indicating a purity of about 75–80 percent with excess thiodiglycol as an impurity.

EXAMPLE 5: Paper Strength Additives

The effectiveness of the sulfonium polymers in increasing wet and dry strength properties of paper was examined using an unbleached hardwood soda pulp beaten to about 400 CSF. The sulfonium polymers were incorporated at the desired loading as beater additives. Then handsheets were formed and dried in an Elmes laboratory hot press for 4 minutes with the top platen held at about 115° C. The sheets were conditioned in the test room and cut in a standard manner to provide the test specimens.

Typical test results using the thiodiglycol derivative described in Example 4 as an additive are given in Table 1. It is evident that this additive enhances the wet and dry strength of the paper. At the same time it showed very little effect on the paper sizing.

Other sulfonium polymers prepared from the sulfonium monomers (Example 3) or by reaction of poly(2(73-chloromethyl-1,3-butadiene with such sulfides as dimethyl sulfide and methyl-nonyl sulfide by the process described in Example 4 also enhance the wet and dry strength of paper.

TABLE 1

Beater Additive

| Wt. % sulfonium Polymer | Final pH | Tensile Strength Dry (% increase) | Tensile Strength Wet (% of dry) | Burst Strength Dry (% Increase) | Burst Strength Wet (% of Dry) |
|---|---|---|---|---|---|
| None (Control) | 7.9 | — | 1.0% | — | 3.0% |
| 0.5% | 6.1 | 28.6% | 17.3% | 38.7% | 27.9% |
| 1.0% | 6.4 | 34.6% | 18.1% | 47.3% | 25.8% |
| 2.0% | 6.5 | 26.5% | 19.6% | 46.6% | 26.5% |
| None (control) | 8.9 | — | 9.8% | — | 10.2% |
| 1.0% | 8.8 | 22.0% | 22.4% | 49.9% | 28.3% |

EXAMPLE 6: Reactivity of Organic Amines and Sulfides

To demonstrate the reactivity of amines and sulfides which can be used to prepare the cationic products of this invention, the following procedure was used. About 2.5–3.0 mmoles of amine or sulfide was added to 0.25 parts (2.2 mmoles) of benzyl chloride in 25 parts 65 percent aqueous ethanol. The mixture was agitated for a given time, usually about 16 hrs. at room temperature (r.t.), acidified and titrated potentiometrically for ionic chloride. A blank was run concurrently to correct for reaction with the solvent which was usually less than about 5 percent.

The reactivity of a number of typical amines and sulfides determined in the general manner described is shown in Table 2. Suitable amines and sulfides are those which react with a stoichiometric amount of benzyl chloride to displace at least 5 mole percent of the chloride therefrom in 48 hrs. at 20°–100° C. and are soluble to the extent of at least 5 wt. percent in a polar hydroxylic solvent such as water, aqueous ethanol or aqueous glycol.

Table 2

Reactivity of Amines and Sulfides with Benzyl Chloride

| Reactant | Conditions | % Reaction |
|---|---|---|
| ammonia | 16 hrs; r.t. | 6% |
| trimethylamine | 16 hrs; r.t. | 100% |
| pyridine | 16 hrs; r.t. | 100% |
| dimethylamine | 16 hrs; r.t. | 97% |
| dimethylaminoethanol | 16 hrs; r.t. | 95% |
| dodecylamine | 18 hrs; r.t. | 100% |
| dimethyldodecylamine | 18 hrs; r.t. | 86% |
| dimethyl sulfide | 6 hrs; 35°C | 10% |
| bis(2-hydroxyethyl) sulfide | 2 hrs; 60–75°C | 90% |

We claim:

1. A sulfonium monomer of the formula:

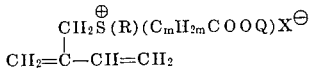

$$CH_2\overset{\oplus}{S}(R)(C_mH_{2m}COOQ)X^{\ominus}$$
$$\underset{|}{CH_2}=\overset{|}{C}-CH=CH_2$$

where
R is $C_1$–$C_6$ alkyl;
m is an integer from 1–4 inclusive;
Q is $C_1$–$C_6$ alkyl, and
X is chloride, bromide, sulfate, bisulfate, nitrate, carbonate, acetate, or citrate.

2. The monomer of claim 1 where R is methyl.

3. The monomer of claim 1 where R is methyl, $C_mH_{2m}COOQ$ is $-C_2H_4COOCH_3$, and $X^{\ominus}$ is chloride.

4. The monomer of claim 1 where X is chloride.

* * * * *